US007677117B2

(12) United States Patent
Perriard et al.

(10) Patent No.: US 7,677,117 B2

(45) Date of Patent: Mar. 16, 2010

(54) FORCE-SENSING DEVICE FOR VEHICLE RUNNING GEARS

(75) Inventors: Jacques Perriard, Romont (CH); Felix Schmid, Belfaux (CH)

(73) Assignee: Vibro-Meter SA (CH)

( * ) Notice: Subject to any disclaimer, the term of this patent is extended or adjusted under 35 U.S.C. 154(b) by 420 days.

(21) Appl. No.: 11/692,553

(22) Filed: Mar. 28, 2007

(65) Prior Publication Data

US 2007/0228825 A1 Oct. 4, 2007

(30) Foreign Application Priority Data

Mar. 29, 2006 (CH) ...................................... 500/06
Jul. 5, 2006 (CH) .................................... 1079/06

(51) Int. Cl.
*G01L 1/00* (2006.01)

(52) U.S. Cl. ............................. 73/862.626; 73/862.69; 73/862.621; 73/779

(58) Field of Classification Search .................. 73/129, 73/779, 780, 862.041, 862.042, 862.12, 862.331, 73/862.337, 862.626, 862.69, 862.642; 303/112, 303/126; 188/181 T; 336/20
See application file for complete search history.

(56) References Cited

U.S. PATENT DOCUMENTS 3,625,053 A * 12/1971 Laimins ...................... 73/765
3,861,203 A * 1/1975 Dahle et al. .................. 73/779
4,175,428 A * 11/1979 Eilersen ................ 73/862.626
4,474,060 A 10/1984 Crossman ................... 73/129

* cited by examiner

*Primary Examiner*—Lisa M Caputo
*Assistant Examiner*—Punam Patel
(74) *Attorney, Agent, or Firm*—Ostrolenk Faber LLP

(57) ABSTRACT

In a measuring device for the measurement of forces in a vehicle undercarriage, more particularly of the brake torque on a vehicle undercarriage, e.g. an aircraft landing gear, a sensor is introduced into a hollow connecting element that is transversally loaded by said forces, which sensor produces a measuring signal in function of a deformation of said connecting element. Distance measuring elements which detect the distance of the inner wall of said connecting element from said sensor are used as measuring elements.

15 Claims, 4 Drawing Sheets

46 44 42 38 36 III 38 20 22 8 14 28 30 32 16 24 26 34 12 50 40 III 34 78 77 75 51 76 20 52 16 50 54

PRIOR ART

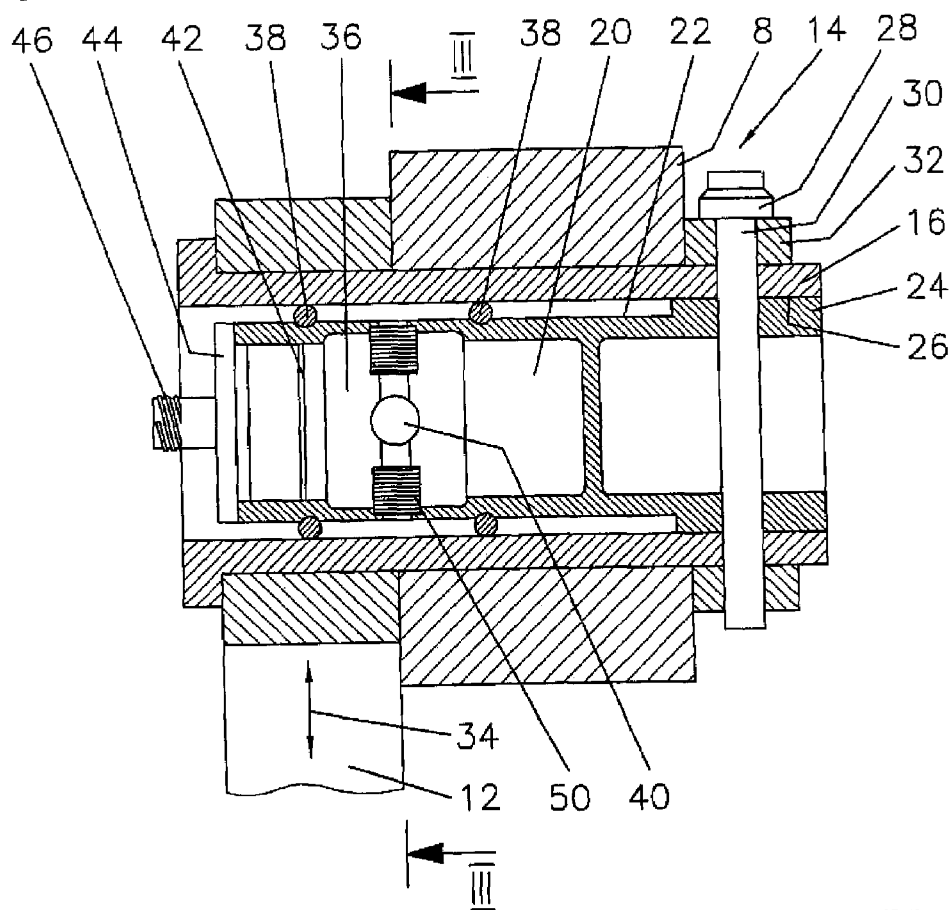
FIG. 2
46
44
42
38
36
III
38
20
22
8
14
28
30
32
16
24
26
34
12
50
40
III
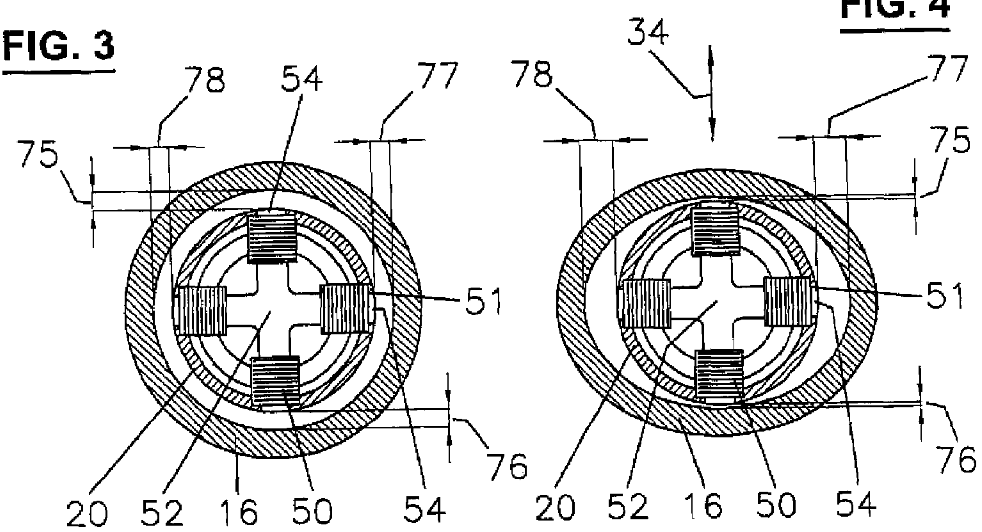
FIG. 3
78
54
77
75
51
76
20
52
16
50
54
FIG. 4
34
78
77
75
51
76
20
52
16
50
54

58
$U_{REF}$
$U_{OSC}$
68
66
64
71
70
$U_B$
$U_A$
$\frac{A-B}{A+B}$
73
$U_{OUT}$
62
60
U
I
$I_B$
$I_A$
51
50
50
52
A
B A
B
50
51
60
62
58
68
66
64
79
77
71
70
80
85
83
81
PI(D)
Σ
U
I
$U_{OUT}$
$U_{REF}$
$U_{OSC}$
$I_A$
$I_B$
$U_A$
$U_B$

FORCE-SENSING DEVICE FOR VEHICLE RUNNING GEARS

FIELD OF THE INVENTION

The present invention relates to a device for measuring a force in a vehicle undercarriage, more particularly the brake torque, said force being transmitted to said vehicle undercarriage by a bar-shaped member and said bar-shaped member being loaded transversally by said force. The invention further relates to a sensor for such a device.

PRIOR ART

The brakes of aircraft consist of stacks of mutually interleaved brake disks that are pressed against each other by hydraulic or electric actuators. One of the stacks is connected to the respective wheel. The other stack is connected to the stationary part of the landing gear for receiving the brake torque. In order to transmit the brake torque, i.e. the torque that appears when the brakes are activated, to the landing gear, the latter stationary stack is non-rotatably locked to the landing gear in a suitable manner. Generally, this is achieved by a fastening device that is arranged on the stationary stack eccentrically with respect to the axis of the wheel, in the simplest case a bore. A bolt serves for connecting the stationary stack to the landing gear directly or via a torque arm. This bolt is highly stressed by the torque in the transversal direction and is consequently made of a high-strength material. However, since its diameter is generally relatively large, it is made hollow in order to reduce its weight.

For various reasons it is desirable to measure the momentary braking action. To this end, U.S. Pat. No. 4,474,060 suggests designing the bushing that is normally arranged between the mentioned bolt and the respective receiving opening as a torque sensor. However, the disadvantage of this solution is that it involves a modification of the elements which serve for force transmission, thereby causing considerable expenditure for the certification of this solution. The certification is relatively time-consuming and costly and may furthermore be required, in the extreme case, for each aircraft type separately.

Similar problems in the measurement of the brake torque may also be encountered in other types of vehicles whose braking systems are similar to those of aircraft. Furthermore, in the undercarriages of aircraft and other vehicle types, other forces whose measurement is desirable or important may appear, e.g. due to bumps, suspension, damping elements, vehicle weight, etc.

SUMMARY OF THE INVENTION

It is therefore an object of the present invention to provide a device for measuring forces in a vehicle undercarriage, more particularly the brake torque, that can be mounted without any substantial interventions in the transmission path of the brake torque.

This is accomplished by a device wherein at least one sensor is arranged in the interior of said bar-shaped member and measures the deformation of said bar-shaped member that is due to said transversal load. The following claims indicate preferred embodiments and sensors for use in the device.

Accordingly, the device comprises a sensor located in a connecting element that is generally bar-shaped and is transversally loaded and concomitantly deformed by the force or forces that is/are to be measured, e.g. by the brake torque. More particularly, the sensor is designed to detect the distance between the sensor and the inner walls of the cavity in the connecting element in which the sensor is located. Preferentially, capacitive or inductive distance measuring elements are used for this purpose.

BRIEF DESCRIPTION OF THE DRAWINGS

The invention will be further explained by means of an exemplary embodiment and with reference to figures.

FIG. 2 longitudinal section of a connecting element comprising a sensor of the invention;

FIG. 3 cross-section according to III-III in FIG. 2, connecting element in the unstressed condition;

FIG. 4 as FIG. 3 but connecting element loaded by brake torque;

DETAILED DESCRIPTION OF PREFERRED EMBODIMENTS

Figure 1:
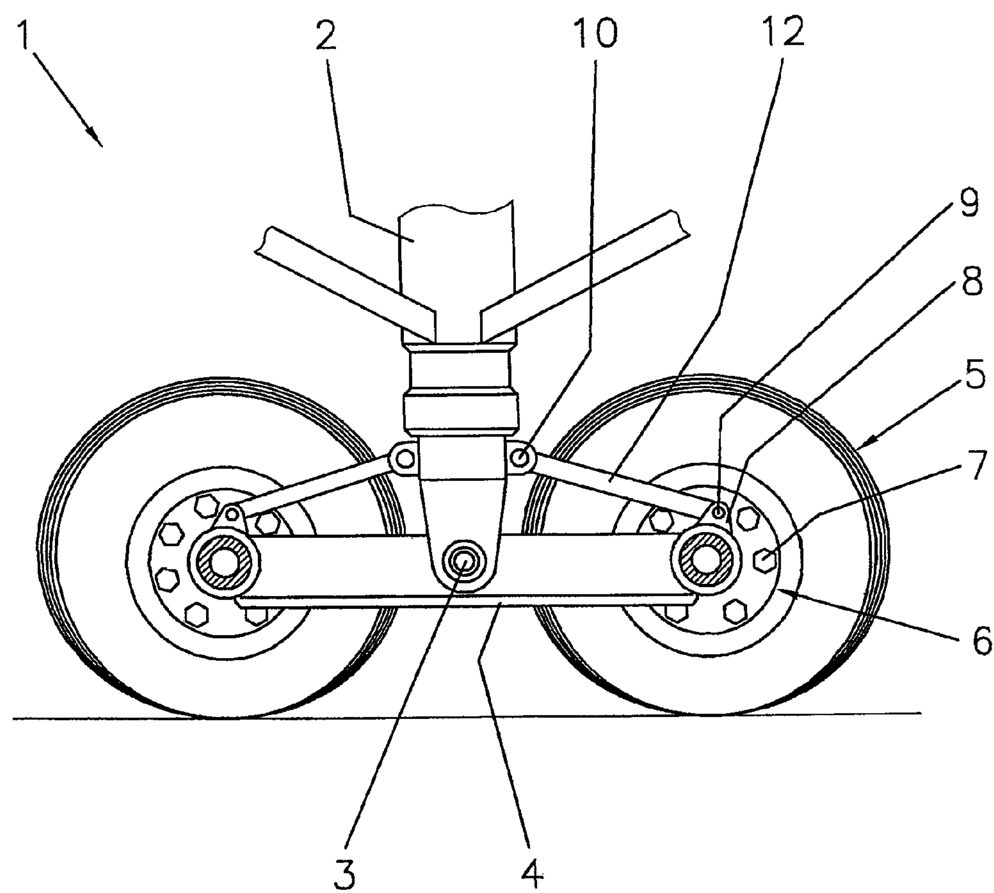
FIG. 1 schematic illustration of an aircraft landing gear (bogie)

FIG. 1 shows the basic structure of an aircraft landing gear 1. On a landing gear strut 2, a bogie train 4 is mounted by a pivot 3. The bogie train supports wheels 5. Wheels 5 are provided with brakes 6 that are actuatable by (e.g. hydraulic) actuators 7. The stationary disk stack of brake 6 has a lever 8 with a bore 9. A torque arm 12 is fastened to bore 9 as well as to an attachment point 10 and transmits the brake torque from brake 7 to landing gear 1 during brake application.

The depicted basic construction of an aircraft landing gear corresponds to the state of the art for larger aircraft. Alternatively, instead of using torque arm 12, it is also common, especially in smaller aircraft, to transmit the torque from the brake directly to the landing gear, e.g. by a direct bolt connection.

FIG. 2 shows a longitudinal section of the connection between brake torque arm 12 and the stationary part 14 of brake 6, the above-mentioned lever 8 being considered as belonging to stationary part 14.

Bolt 16 extends through bore 9 in lever 8 as well as through a bore 15 at the end of brake torque arm 12. Bolt 16 is made of a high-strength material and is largely hollow to reduce its weight. However, during brake application, it is still noticeably deformed. For example, a deformation of 4/10 mm has been observed in a bolt having an internal diameter of 50 mm.

Bolt 16, which is hollow, contains sensor 20. At its end on the right in the figure, enclosure 22 is provided with projections or has such an overall diameter that it is in close contact with inner wall 26 of bolt 16. Bolt 16 as well as end 24 of sensor 20 are here traversed by a bore through which a pin 28 is pushed. Pin 28 is held in a bore 30 in an orientation ring 32 that is attached to lever 8, i.e. to the stationary part 14 of brake 6. The purpose of this device is to lock the sensor in a predetermined, fixed orientation relative to the brake torque (arrow 34).

On the outside of portion 36 of sensor 20 on the left in FIG. 2, O-rings 38 are attached. The latter serve the purpose of maintaining this part of sensor 20 approximately centrally and of absorbing the deformations of bolt 16 when it is loaded by brake torque 34, enclosure 22 of sensor 20 being substantially rigid. Portion 36 of sensor 20 comprises an inductive distance measuring element 40 and an associated supply and evaluation circuit on a circuit board 42. The sensor enclosure is sealed by a plate 44 on which electric connector 46 is located through which the electrical connections (not shown) are established.

As appears more clearly in FIGS. 3 and 4, inductive measuring element 40 is essentially composed of two perpendicularly arranged coil assemblies 50 and 51 located on a cruciform core 52. Core 52 has a high magnetic permeability. More specifically, it is composed of a stack of a magnetically soft material in order to avoid eddy currents that might appear during AC excitation of coil assemblies 50, 51.

Arms 54 of core 52 along with the outer ends of coils 50, 51 are maintained in corresponding bores respectively recesses of enclosure 22 such that the ends of arms 54 represent a part of the enclosure surface of sensor 20. In this manner, a magnetic field emitted from core 52 through arms 54 may leave respectively enter into the sensor unrestrictedly. In order not to disturb the propagation of such a magnetic field, enclosure 22 of sensor 20 is made, at least in the area near inductive distance measuring element 40, of a material having a low magnetic permeability.

Inductive distance measuring element 40 serves for measuring radial distances between bolt 16 and sensor 20, as illustrated in FIGS. 3 and 4. Due to the deformation of bolt 16 into an oval (see FIG. 4), the distances in the direction of force 34 (distances 75, 76) decrease and those perpendicularly to force 34 (distances 77, 78) increase. Since this is independent from the direction in which the force is acting along arrow 34, the measurement also fulfills the frequently demanded requirement of measuring the absolute value of force 34.

Although a simple coil assembly with a bar-shaped core would be sufficient for the measurement, the cruciform arrangement of two coil assemblies is provided in order to be able to separate the effect of brake torque 34 from other influences and furthermore to allow a simpler derivation of the brake torque from the measuring signals of inductive distance measuring element 40. Moreover, errors on account of an imprecisely centered position of measuring element 40 within bolt 16 are eliminated.

A prerequisite for using an inductive distance measuring element is that bolt 16 is also made of a material having a high magnetic permeability, which is commonly the case today. The usual high-strength materials for these components exhibit sufficient magnetic properties in this respect.

For the measurement, the coil pairs 50, 51 are separately supplied with an alternating current, and the alternating voltage across the coils is measured. By a synchronous demodulation of these voltages by a voltage having the same frequency but which is offset by 90°, the imaginary part of the voltage is obtained, i.e. the part that is due to inductance. Therefrom, using the evaluation described in more detail below, it is possible to generate a measuring signal that is proportional to the brake torque.

Figure 5:
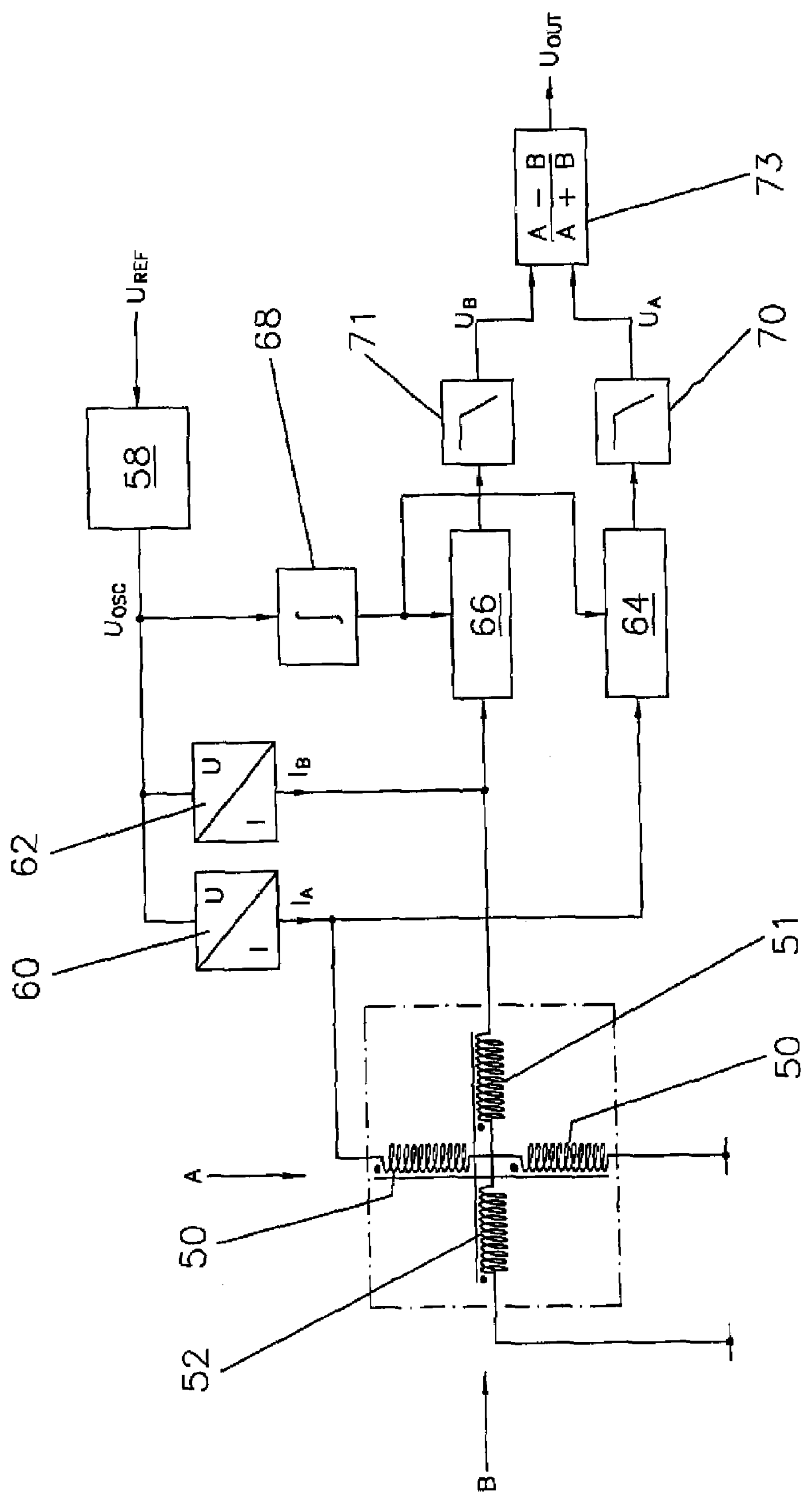
FIG. 5 block diagram.

The circuitry around inductive distance measuring element 40 is schematically illustrated in FIG. 5. An oscillator 58 generates a voltage $U_{osc}$ having a frequency ω and whose amplitude is predetermined by an externally preset voltage $U_{REF}$. By adjusting $U_{REF}$, a possible temperature dependence of inductive distance measuring element 40 can be compensated. This will not be further discussed hereinafter, but it is conceivable to arrange a temperature probe in sensor 20 and to adjust $U_{REF}$ in function of its signal.

$U_{osc}$ is converted by two current-voltage converters 60, 62 into currents $I_A$ and $I_B$ that are supplied to coils A 50 and B 51. The voltages across A and B are supplied to synchronous demodulators 64, 66 to which the output signal $U_{osc}$ of oscillator 58, shifted 90° by an integrator 68, is supplied as the second signal. After low-pass filtering in respective low-pass filters 70, 71, output signals $U_A$ and $U_B$ are obtained which correspond to the pure inductance of coil assemblies 50, 52, respectively, i.e. without their ohmic components. Low-pass filters 70, 71 serve for eliminating the carrier frequency. The two voltages $U_A$ and $U_B$ are supplied to an analog or digital processing unit 73 which divides the difference of the input signals by the sum of the input signals, thereby yielding output signal $U_{OUT}$. As will be demonstrated, this voltage is proportional to force F acting upon bolt 16.

For the purposes of the following derivation it will be assumed that coil assemblies A and B are each the result of serial connections of ideal inductances $L_A$ respectively $L_B$ and of ohmic components $R_A$ respectively $R_B$. The ohmic component includes iron losses, the ohmic resistance of conductors, etc. As far as alternating voltages and currents are concerned, the currents and voltages indicated below shall normally be considered as vectorial values.

The voltage induced in coil assembly A (that corresponds to coil pair 50) by current $I_A$ is:

$$U_A = U_{L_A} + U_{R_A} \quad \text{Eq. 1}$$

and:

$$U_{L_A} = L_A I_A \omega \quad \text{Eq. 2}$$

where:

$U_{L_A}$ alternating voltage component due to the pure inductance, $U_{R_A}$ component due to the parasitic ohmic components.

The pure inductance $L_A$ of coil assembly A is equal to:

$$L_A = n_A^2 \Lambda_A = n_A^2 \mu_0 \frac{A_{P_A}}{d_A} = \frac{K_A}{d_A} \quad \text{Eq. 3}$$

where:

$n_A$ number of windings of A $\mu_0$ magnetic permeability $A_p$ pole cross-section of A $d_A$ air gap in the magnetic circle of A, i.e. the sum of distances 75 and 76 (FIG. 4)

$K_A$ constant: $K_A = n_A^2 \mu_0 A_{p_A} / d_A$

The variation of air gap $d_A$, equivalent to the sum of distances 75 and 76, is approximately proportional to brake torque F:

$$d_A = d_0 + CF \quad \text{Eq. 4}$$

where:

C mechanical constant, dependent upon bolt 16.

$d_0$ air gap $d_A$ in no-load condition (F=0)

From equations (2), (3), and (4) it follows that:

$$U_{L_A} = I_A \omega K_A \frac{1}{d_0 + CF} \quad \text{Eq. 5}$$

and by an analogous derivation for coil assembly B:

$$U_{L_B} = I_B \omega K_B \frac{1}{d_0 - CF} \quad \text{Eq. 6}$$

Furthermore, with an identical, symmetrical design of coil pairs 50, 51, the following applies:

$$I_A \omega K_A = I_B \omega K_B \qquad \text{Eq. 7}$$

When Eq. (7) is entered into Eq. (5) and (6), one obtains for $U_{OUT}$:

$$\begin{aligned} U_{OUT} &= \frac{U_{L_A} - U_{L_B}}{U_{L_A} + U_{L_B}} \\ &= \frac{K\left[\frac{1}{d_0 + CF} - \frac{1}{d_0 - CF}\right]}{K\left[\frac{1}{d_0 + CF} + \frac{1}{d_0 - CF}\right]} \\ &= \frac{CF}{d_0} \\ &= K_2 F \end{aligned} \qquad \text{Eq. 8}$$

Thence, $U_{OUT}$ is proportional to brake torque F.

Figure 6:
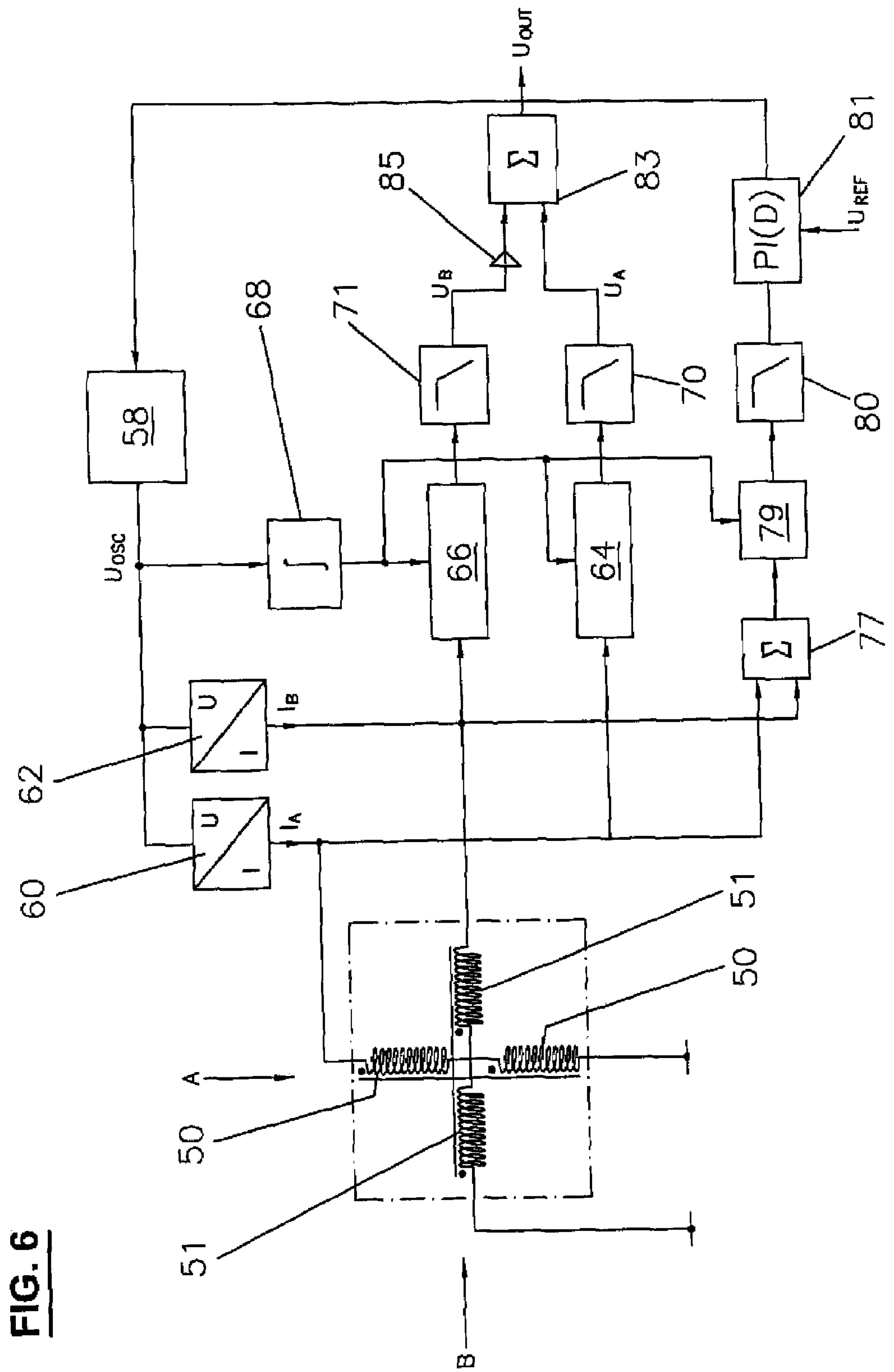
FIG. 6 block diagram of a variant of the circuit of FIG. 5.

The division by $(U_{L_A}+U_{L_B})$ in Eq. 8 is difficult to perform analogically and also relatively demanding digitally. FIG. 6 shows a variant where this division is avoided by keeping $(U_{L_A}+U_{L_B})$ constant.

The circuit of FIG. 6 largely corresponds to that of FIG. 5, especially with regard to the components designated by concordant reference numerals.

In contrast to FIG. 5, the voltages across coils A 50 and B 52 are supplied to an adder 77. The resulting sum $U_A+U_B$ is supplied to a third synchronous demodulator 79 whose output delivers the sum $U_{L_A}+U_{L_B}$ after adequate smoothing by a low-pass filter 80. This signal is supplied to a PI controller 81 as the actual value while $U_{REF}$ is the command value. Optionally, the regulating behavior can be further improved by the addition of a differential component (PID controller).

PI or PID controller 81 controls the amplitude of oscillator 58.

Thus the factor $$\frac{1}{U_{L_A} + U_{L_B}}$$

is constant, and the result is:

$$U_{OUT}*(U_{L_A}+U_{L_B})=U_{L_A}-U_{L_B}=(U_{L_A}+U_{L_B})K_2F=K_3F \qquad \text{Eq. 9}$$

where $K_3$=constant.

Thus, the output signal of adder 83 preceded by inverter 85, i.e. the difference $U_{L_A}-U_{L_B}$, is directly indicative of the force F, and the demanding division is avoided. In particular, this variant can also be implemented by analog means.

A particular advantage of the described sensor is that it is insertable into existing connecting bolts 16 without the need of altering the mechanical construction in a way that would require a recertification. Moreover, the sensor can be mounted respectively inspected or replaced on location, i.e. during regular aircraft maintenance.

From the preceding description of an exemplary embodiment, numerous modifications are accessible to those skilled in the art without leaving the scope of the invention that is solely defined by the claims. Conceivable are the following, inter alia:

- Using other distance measuring elements than inductive ones, e.g. capacitive ones or measuring elements based on eddy currents; in the case of capacitive elements, the indicated evaluation circuits would have to be supplied with alternating current and the blind current would be measured as the equivalent of the imaginary component of the signal of inductive measuring elements.
- Arranging the measuring element in a completely sealed enclosure of the sensor. In this case, the measuring element, e.g. inductive distance sensor 40, can be fastened to a support inside sensor enclosure 24.
- Building up the distance sensor of two separate sensors yet preferably at a small distance along bolt 16, i.e. each near the junction of the two parts 12, 14 that are connected by the bolt and where the strongest deformation of the connecting element (bolt 16) by the arising forces is to be expected;
- Using a different core material for the inductive measuring element, e.g. one that is based on ferrites.

The invention claimed is:

1. A device positioned in a vehicle undercarriage for measuring a brake torque force, the device comprising:

a bar-shaped member positioned and configured to transmit to the vehicle undercarriage the brake torque force loaded transversally to the bar-shaped member;

at least one sensor positioned in the interior of said bar-shaped member and configured to measure the deformation of said bar-shaped member due to the transversal load of the brake torque force;

an enclosure configured to house the sensor and attachable to said bar-shaped member; and a measuring element positioned in said enclosure and configured to measure signals as a function of a distance of said measuring element from a surface of said bar-shaped member, wherein said measuring element is an inductive distance measuring element or a measuring element based on eddy current effects.

2. The device of claim 1, wherein said measuring element is positioned at a distance from a surface of said bar-shaped member, and said sensor is configured to generate a measuring signal as a function of the distance.

3. The device of claim 1, wherein said measuring element includes at least two measuring assemblies configured to measure radially directed deformations in said bar-shaped member and positioned orthogonal to one another in order to distinguish different types of deformations of said bar-shaped member.

4. The sensor device of claim 1, wherein said sensor comprises the measuring element, and said enclosure has a low or no magnetic permeability such that said enclosure is unrestrictedly permeable by the magnetic field of the measuring element.

5. The device of claim 4, wherein said measuring element includes at least one coil on a core extending transversally through said enclosure and said enclosure is sufficiently permeable to a generated magnetic field so as to allow the magnetic field to extend outside of said sensor enclosure and to be influenced by a spatial proximity of a magnetically conductive material.

6. The device of claim 1, further comprising elastically deformable locating units positioned on and outside of the enclosure, and said enclosure is undeformable such that said sensor is maintained centered and undeformed in an interior of said bar-shaped member by said locating units even when said bar-shaped member is deformed.

7. The device of claim 6, wherein said locating units comprise rings of a rubber-elastic material.

8. The device of claim 1, wherein two measuring elements are positioned orthogonally to each other in order to allow distinction of deformation types of a bar-shaped member surrounding said sensor.

9. The device of claim 1, further comprising a circuit configured to drive said measuring element and/or to condition an output signal of the measuring element.

10. A circuit for a device of claim 9, wherein said circuit comprises:

an arrangement configured to apply an alternating voltage or an alternating current to said measuring elements;

an arrangement configured to determine a capacitive or inductive component as a useful component of the signal delivered by said measuring element.

11. The device of claim 1, wherein the enclosure comprises a hollow bolt and the sensor is positioned in said hollow bolt, wherein said hollow bolt is loaded transversally by said brake torque force.

12. The device of claim 1, wherein the device is configured to measure the brake torque force in landing gear of an aircraft.

13. A device positioned in a vehicle undercarriage for measuring a brake torque force, the device comprising:

a bar-shaped member positioned and configured to transmit to the vehicle undercarriage the brake torque force loaded transversally to the bar-shaped member;

at least one sensor positioned in the interior of said bar-shaped member and configured to measure the deformation of said bar-shaped member due to the transversal load of the brake torque force;

an enclosure configured to house the sensor and attachable to said bar-shaped member;

a measuring element positioned in said enclosure and configured to measure signals as a function of a distance of said measuring element from a surface of said bar-shaped member, wherein two measuring elements are positioned orthogonally to each other in order to allow distinction of deformation types of a bar-shaped member surrounding said sensor; and A circuit for the device comprising:

an arrangement configured to apply an alternating voltage or an alternating current to said measuring elements;

an arrangement configured to determine a capacitive or inductive component as a useful component of the signal delivered by said measuring element;

an arrangement configured to compute the quotient between the difference of the capacitive or inductive components of the two orthogonally arranged measuring elements and the sum of the two components, the two components being proportional with equal factors to a reciprocal value of a sum respectively of a difference of a no-load value d0 and a deformation value.

14. A device positioned in a vehicle undercarriage for measuring a brake torque force, the device comprising:

a bar-shaped member positioned and configured to transmit to the vehicle undercarriage the brake torque force loaded transversally to the bar-shaped member;

at least one sensor positioned in the interior of said bar-shaped member and configured to measure the deformation of said bar-shaped member due to the transversal load of the brake torque force;

an enclosure configured to house the sensor and attachable to said bar-shaped member;

a measuring element positioned in said enclosure and configured to measure signals as a function of a distance of said measuring element from a surface of said bar-shaped member, wherein two measuring elements are positioned orthogonally to each other in order to allow distinction of deformation types of a bar-shaped member surrounding said sensor; and A circuit for the device comprising:

an arrangement configured to apply an alternating voltage or an alternating current to said measuring elements;

an arrangement configured to determine capacitive or inductive component as a useful component of the signal delivered by said measuring element;

an amplitude control input of said oscillator arrangement configured to adjust an amplitude of said alternating voltage or current;

an arrangement configured to form a sum of the useful components of the signals of said measuring elements;

a comparator arrangement configured to compare the sum of the useful components to a predetermined value and configured to generate an output signal at an output connected to said amplitude control input of said oscillator arrangement in order to keep the sum of the useful components constant.

15. The circuit of claim 14, wherein a measuring arrangement forms the difference of the useful components of the signals delivered by said measuring elements.

* * * * *

UNITED STATES PATENT AND TRADEMARK OFFICE

CERTIFICATE OF CORRECTION

PATENT NO. : 7,677,117 B2
APPLICATION NO. : 11/692553
DATED : March 16, 2010
INVENTOR(S) : Jacques Perriard and Felix Schmid It is certified that error appears in the above-identified patent and that said Letters Patent is hereby corrected as shown below:

Col. 6, in claim 4, line 48, please delete the word "sensor". Claim 4, line 48 should read as follows:

-- The device of claim 1, wherein said sensor comprises --

Col. 8, in claim 14, line 30, please insert the word -- a --. Claim 14, line 30 should read as follows:

-- an arrangement configured to determine a capacitive or --

Signed and Sealed this

Fifteenth Day of June, 2010

David J. Kappos
*Director of the United States Patent and Trademark Office*